(12) United States Patent
Spertus

(10) Patent No.: US 6,584,478 B1
(45) Date of Patent: Jun. 24, 2003

(54) TRANSPARENT GARBAGE COLLECTION OF RESOURCES

(75) Inventor: Michael P. Spertus, Chicago, IL (US)

(73) Assignee: Geodesic Systems, Incorporated, Chicago, IL (US)

(*) Notice: Subject to any disclaimer, the term of this patent is extended or adjusted under 35 U.S.C. 154(b) by 0 days.

(21) Appl. No.: 09/623,275

(22) PCT Filed: Mar. 2, 1999

(86) PCT No.: PCT/US99/04528

§ 371 (c)(1),
(2), (4) Date: Sep. 1, 2000

(87) PCT Pub. No.: WO99/45481

PCT Pub. Date: Sep. 10, 1999

Related U.S. Application Data

(60) Provisional application No. 60/076,626, filed on Mar. 3, 1998.

(51) Int. Cl.[7] .............................................. G06F 17/30
(52) U.S. Cl. ...................................................... 707/206
(58) Field of Search ................................ 707/206, 102, 707/103 R; 717/120, 110, 108; 714/39

(56) References Cited

U.S. PATENT DOCUMENTS 6,081,665 A * 6/2000 Nilsen et al. ................ 717/116
6,381,738 B1 * 4/2002 Choi et al. ................... 717/124
6,457,018 B1 * 9/2002 Rubin .............................. 707/4

* cited by examiner

Primary Examiner—Diane D. Mizrahi
(74) Attorney, Agent, or Firm—Gordon E. Nelson

(57) ABSTRACT

Techniques for transparently registering non-memory resources used by a program with a garbage collector so that the non-memory resources can be freed when the program is finished using them. The techniques automatically determine from the program that the execution will use a resource and then automatically modify the program's behavior so that the resource is registered. When the program is finished with the resource, it can be determined from the registry whether the resource must be freed. In one embodiment, the technique is employed in a garbage collector for doing resource garbage collection with legacy C and C++ programs. The garbage collector locates invocations that allocate such resources in the code and modifies the code so that when it is executed, the resources are registered. The techniques can also be used to ensure that finalizers associated with objects are executed before the object is freed. In this use, the invocation of the constructor for the object is modified so that the object and its finalizer are registered. When the object is no longer in use, the garbage collector uses the registry to obtain the object's finalizer, which it executes before it frees the object. Where the object represents a resource, execution of the finalizer will free the resource.

47 Claims, 7 Drawing Sheets

AFTER PROCESSING BY GARBAGE COLLECTOR, 601

201 {
```
void noisyCleanup (void *a)  { /*cleanup action/}
...                         ─205
int *ip = (int *) malloc  (sizeof int);
gcDeclareFinalizer (ip, noisyCleanup);
```
─203 (points to noisyCleanup)
─207 (points to gcDeclareFinalizer)

| object pointer    213 | finalizer pointer    215 |
|---|---|
|  |  |
|  |  |
|  |  |
|  |  |
|  |  |
|  |  |
|  |  |

RTE, 211

Registration Table, 209

217 {
```
include "gct.h"              ─219 class A:    public gcCleanup { ~ A() { cleanup action } }
                    ─221
```

Fig. 2

(PRIOR ART)

TRANSPARENT GARBAGE COLLECTION OF RESOURCES

CROSS REFERENCES TO RELATED APPLICATIONS

This patent application claims priority from U.S. provisional application No. 60/076,626, Spertus, Garbage collection of resources, filed Mar. 3, 1998.

BACKGROUND OF THE INVENTION

1. Field of the Invention

The invention relates generally to the management of the resources used by a computer program in the course of its execution and more specifically to the prevention of resource leaks. A resource leak occurs when a program is finished using a resource but does not free it for use by other programs.

2. Description of the Prior Art: FIGS. 1 and 2

A program that is executing on a computer system uses resources provided by the computer system. The resources include memory and non-memory resources such as files and input-output devices. In many cases, access to these non-memory resources is provided by the operating system, which itself maintains data structures representing these resources Leaks may occur with any of these resources. Memory leaks have long been dealt with by garbage collectors, that is, programs which check for memory which was allocated by a program but is no longer being used by the program and may therefore be freed for use by other programs. A successful commercial example of a garbage collector is the Great Circle™ garbage collector, manufactured by Geodesic Systems, Inc. An overview of this garbage collector was available on Feb. 22, 1999 at http://www.geodesic.com/greatcircle/overview.html. The Great Circle garbage collector works not only with programs specifically coded to be run with it, but also with programs that were not coded to be run with it, and can thus be used with legacy programs, that is, programs that are still useful but cannot be economically reimplemented to take advantage of innovations such as garbage collectors.

Non-memory resources pose a problem for garbage collectors. FIG. 1 shows why. The figure shows a program that is written in an object-oriented programming language such as C++ as the program is being executed in a computer system. In object-oriented programming languages, the program manipulates objects, that is, entities which belong to classes. The class to which an object belongs defines a fixed set of operations that may be performed on the class. FIG. 1 shows how such programs are typically implemented. Code 107 for the program consists of code 111 for a main program and code 113 for the operations for the classes of objects which are used by main program code 111 and code 113. One set of code for objects of class N is shown at 115. Included in the operations defined for a class are a constructor operation 117, which performs the actions necessary to construct an object of the class, and a destructor operation 119, which performs any actions that need be done before the storage for an object of the class is freed. The destructor operation is an example of a finalizer operation, namely an operation that a garbage collector must perform before it reclaims an object's storage.

A single object of class N is shown at 121. The object has two parts: specifiers 123 for the operations defined for its class, and the data 125 upon which these operations are performed. In the case of objects of class N, the data includes a font descriptor, a value provided by the operating system to specify a font used by the program. Font descriptor 127 is used by operations of class N that involve functions provided by an operating system font engine, shown at 129. When given a character code, a size specification, and a font descriptor 121, font engine 129 can generate a representation of the character of the specified size in the specified font. In order to accelerate generation of these representations, font engine 129 makes a rendering 131 of the font which it stores in its address space 105. Once the rendering is made, font engine 129 can find the representation by looking it up in the rendering. The font descriptor and its related rendering are examples of non-memory resources. The rendering in particular is large, and efficient operation of the operating system requires that renderings 131 be released when they are no longer required by a program. The following discussion primarily concerns non-memory resources, and unless otherwise indicated, a reference to a "resource" will be understood to be a reference to a non-memory resource.

One of the functions of a class's destructor is to ensure that all resources used by the object are released when the object is destroyed. Thus, destructor 119 for objects of class N 115 includes a call to the operating system which indicates to font engine 129 that font descriptor 127 and its associated rendering 131 may be released for use by other programs. Of course, if the programmer forgets to expressly free object 121, its destructor will never be executed and not only object 121, but also font descriptor 127 and rendering 131 will have leaked.

As can be seen from FIG. 1, having a garbage collector detect that object 121 is no longer in use and freeing object 121 will not by itself solve the problem of the leaked non-memory resources. The garbage collector can free object 121's memory, but since the garbage collector is in general not in a position to know anything about object 121's class or about the contents of its memory, it will not execute destructor 119 when it frees object 121 's memory, and as far as font engine 129 can determine, both font descriptor 127 and rendering 131 are still in use.

In prior art garbage collectors, this problem has been solved by providing registration functions that explicitly indicate to the garbage collector that a destructor is to be executed when an object is freed. When the programmer writes a program that allocates an object for which a destructor must be executed when the object is freed, the code that allocates the object includes the registration function. FIG. 2 shows two examples of such code. The first example, at 201, is written in C; the programmer has written a noisyCleanup function 203 which is to be executed when certain objects are freed. At 205, an object ip is allocated using the malloc function; immediately following this function call, at 207, the programmer has made a call to the gcDeclareFinalizer registration function. This function, which takes the object and the cleanup function as arguments, registers the cleanup function with the garbage collector (in this case, a Great Circle garbage collector).

The result of registration is the creation of an entry for the object in a registration table 209 maintained by the garbage collector. Each registration entry (RTE) 211 in the table specifies two items of information: an object pointer 213, which points to the object whose allocation resulted in creation of the entry, and finalizer pointer 215, which points to the destructor 119 for the object's class. Before freeing an object, the garbage collector searches registration table 209 for a RTE 211 that contains a pointer 213 to the object; if it finds one, it executes the code specified by finalizer pointer 215 in the entry before it frees the object.

Continuing with FIG. 2, 217 shows how a C++ programmer would specify that an object be registered. Because C++ is an object-oriented language, the programmer must specify an object's finalizer as part of its class definition. The #include compiler directive at 219 specifies that the file "gct.h" that contains the class information for the registration operation gcCleanup be included in this file, making the name gcCleanup visible here. The statement at 221 adds gcCleanup to the definition of the class A and defines it for that class. For class A, inheriting from gcCleanup defines the finalizer for class A as the destructor for class A, namely ~A ( ), which is in turn defined to be whatever code is written where cleanup action appears. As a result of this code, every time an object of class A is allocated in a program execution, the object is registered in registration table 209, with finalizer pointer 215 pointing to the code that does the action defined for ~A.

While registration solves the problem of ensuring that a garbage collector not only prevents memory leaks, but also prevents leaks of non-memory resources, registration as presently practiced has two problems:

Since the code specifying registration must be in the program when the program is written, garbage collectors that are used with legacy programs to collect garbage cannot register objects and therefore cannot execute finalization code for the objects.

Even where the programmer is writing new code for execution with a garbage collector, the programmer must still remember to include registration code in the class definition for every object that requires finalization before the object is freed.

What is needed is a technique for making garbage collection of non-memory resources as automatic from the programmer's viewpoint as garbage collection of memory already is. Such a technique would not only make garbage collection of non-memory resources possible with legacy code, but would also relieve the programmer of the burden of concerning him or herself with it when writing new programs. It is an object of the invention to provide such a technique.

SUMMARY OF THE INVENTION

The technique of the invention automatically determines by examining a program that the program will use the resource and then automatically modifies the program's behavior such that the program's execution makes an entry for the resource in a registry. When it is determined that the execution no longer requires the resource, the entry in the registry indicates that the resource is to be released.

The technique of the invention may also be employed to ensure that finalizers associated with objects are executed. The technique automatically determines from the program being executed that the program will use an object and then automatically modifies the program's behavior such that the program's execution makes an entry for the finalizer in the registry. When it is determined that the execution no longer requires the object, the entry indicates that the finalizer that is to be executed in conjunction with freeing the object. One frequent use of a finalizer is to free a resource associated with the object.

Modification of the behavior of the program may be done at any time up through the execution of the program. One way of modifying the program's behavior is to replace a call to a function whose execution entails allocating an object or a resource with a call to a registration function that makes the entry in the registry and then calls the originally-intended function.

The technique may be particularly advantageously employed in conjunction with a garbage collector. The garbage collector performs the actions necessary to modify the behavior of the program and whenever the garbage collector frees an object that is no longer used by the program, the garbage collector executes the object's finalizer if there is an entry for the object in the registry.

Other objects and advantages will be apparent to those skilled in the arts to which the invention pertains upon perusal of the following Detailed Description and drawing, wherein:

BRIEF DESCRIPTION OF THE DRAWING

FIG. 2 is a drawing showing prior-art object registration techniques;

Figure 1:
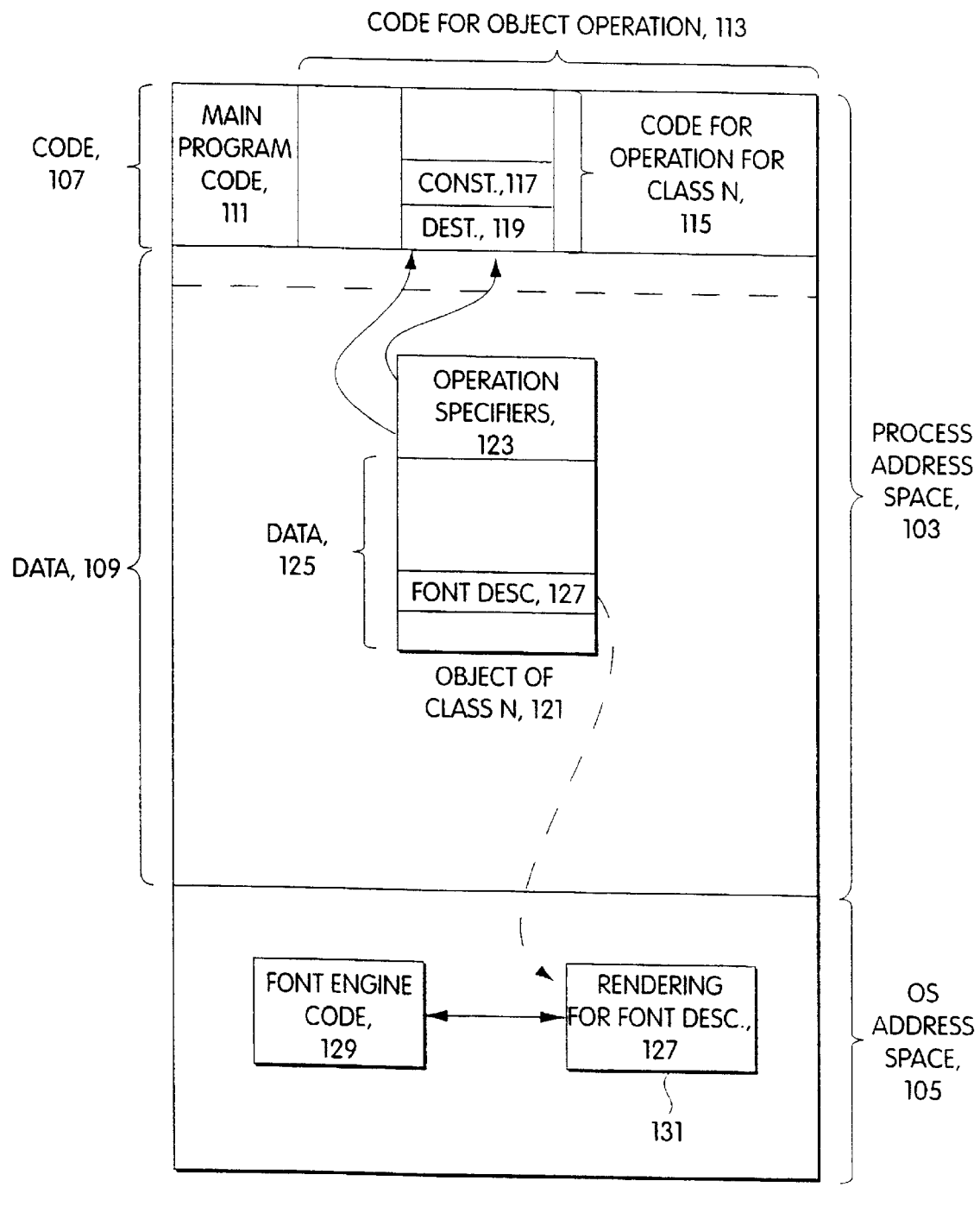
FIG. 1 is a drawing showing an object-oriented program and the resource leak problem.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following detailed description will begin with a conceptual overview of automatic registration of non-memory resources for a garbage collector and will then present a detailed description of a preferred embodiment for use with programs running under the Windows® brand operating systems manufactured by Microsoft Corporation.

Figure 3:
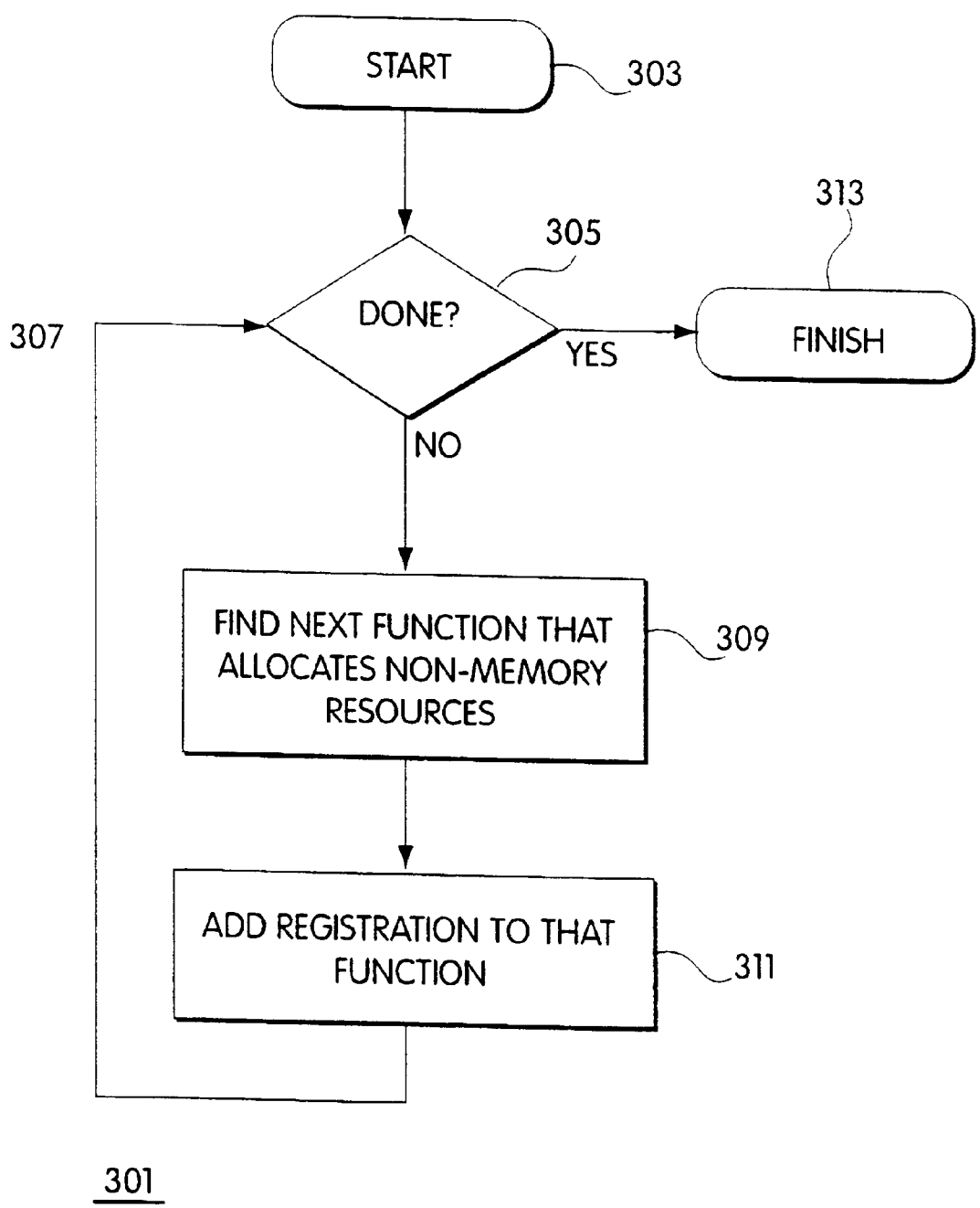
FIG. 3 is a flowchart of automatic registration.
Figure 4:
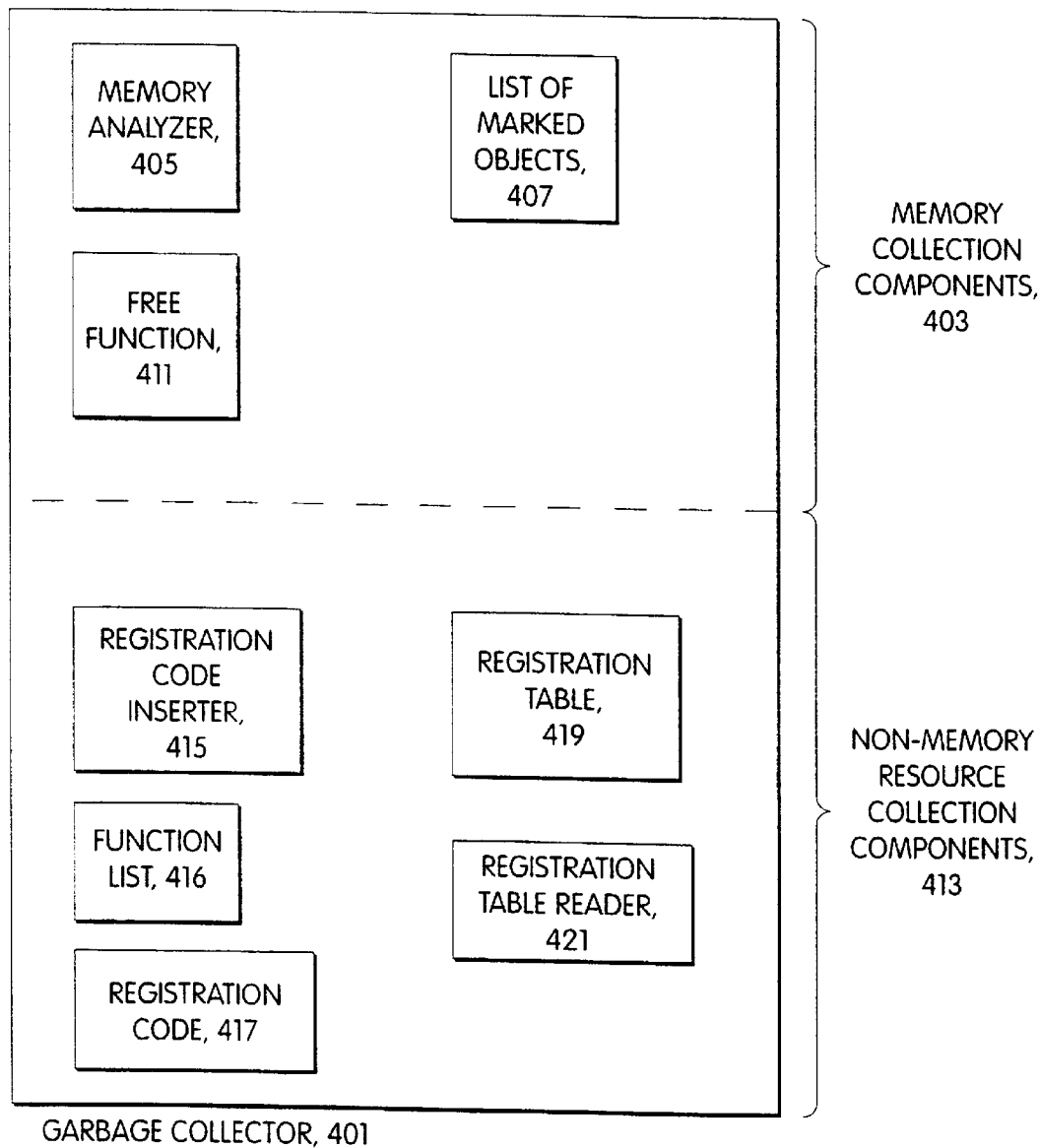
FIG. 4 is a block diagram of a garbage collector that does automatic registration.

Overview: FIGS. 3 and 4

In the prior art, registration of an object for resource garbage collection has required that the programmer specifically add code to his program to do the registration. The present invention adds the code necessary to do registration automatically, that is, without any need for the programmer to change the program's source code. Depending on the embodiment of the invention, the code may be added at any point between the time the programmer has reached a point where the source code can be compiled or interpreted through the time that the object is actually allocated. The code may be added to the source code in a pre-compilation step or during compilation itself, it may be added to the object code either before or after linking, and it may be added to executable code either after loading or during execution. The code may be added in line, or it may be added in the form of an invocation of a registration function. When the code is interpreted, the interpreter may add the code to do the registration at the time the object is actually allocated or the interpreter's code may be modified to do the registration.

FIG. 3 shows in broad overview how the code to do the registration is added. The flowchart of FIG. 3 is executed by a program that in a preferred embodiment is a component of a garbage collector; in other embodiments, it could be a component of a programming system for writing code to be executed in a system that included a garbage collector or even an stand-alone program. The program works as shown in FIG. 4. It searches through the code it is analyzing until it finds a function that allocates an object for which non-memory resources are required (309); when it finds such a function, it adds registration with the garbage collector (311) to that function; it repeats this processing, as shown by loop 307, until no more such allocation functions can be found (305), at which point the program terminates. The program is able to find the functions that allocate objects with non-memory resources because such resources are represented in modem object-oriented programming systems by object class libraries. The class of any object which uses non-memory resources will include a constructor function which creates the object and a destructor function which releases the non-memory resource, and the program need only keep a list of the constructor and destructor functions for objects belonging to those classes. Whenever a function is found which is on the list of constructors, registration is added to the actions performed by the function and the registration registers the object's destructor as its finalizer. Depending on the manner in which programs are represented in the environment in which the programs execute and the stage at which the registration code is inserted, the constructor and destructor functions may be recognized by their names, by their positions in data structures, or by the pointers that represent them.

The technique shown in flowchart 301 can also be applied to programs that are interpreted instead of compiled. With such programs, each function invocation is examined as it is received in the interpreter; when a function invocation is found that matches a function on the list, the code for registration is inserted into the instruction stream. Using this technique, the code for registration can even be inserted when what is being interpreted is machine instructions. Another way of achieving the same end with an interpreter would be to have the interpreter do the registration, instead of inserting the code into the instruction stream.

FIG. 4 shows a garbage collector 401 that has been adapted for automatic registration of objects that use non-memory resources. Memory collection components 403 are used for garbage collecting memory; memory analyzer 405 analyzes the memory currently being used by an execution of a program to determine which objects in the program's memory are currently being used by the program. Such objects are marked and a list 407 of marked objects is made. Then the garbage collector scans memory belonging to the program and uses free function 411 to free any unmarked and therefore unused objects.

Non-memory resource collection components 413 implement automatic registration of objects that use non-memory resources and execution of the finalizer functions for those objects before the objects are freed. Registration code inserter 415 is code which carries out the processing of flowchart 301. In so doing, it uses function list 416, which is a list of the constructor and destructor functions for objects that may use non-memory resources. The registration code inserted by registration code inserter 415 is seen at 417. How the registration code makes the registration table entry for an object depends on the programming environment and the point in time at which the registration code is inserted. The remaining components are registration table 419, which is an implementation of registration table 209, and registration table reader 421, which finds an entry 211 for an object in registration table 419 and then executes the function specified by finalizer pointer 215 in the entry.

Operation of garbage collector 401 is as follows: some time prior to completion of allocation of an object that may use non-memory resources, registration code inserter 415 adds registration code 417 to the code for the object's constructor. As pointed out above, the registration code may be added at any point from when the programmer has the code in condition for automatic processing by the programming system he or she is using on. When an object is allocated using the constructor function with the added registration code, the result is an entry 211 in table 419 whose finalizer pointer 215 specifies the code that needs to be executed to free the non-memory resources belonging to the object. After memory analyzer 405 determines that the object is no longer being used by the program, garbage collector 401 invokes registration table reader 421 with a pointer to the object. Registration table reader 421 finds entry 211 for the object, and causes the function specified by finalizer pointer 215 to be executed. Registration table reader 421 may also invalidate entry 211, thereby making it available to register another object. The finalization function is executed sometime between the time that memory analyzer 405 determines that the object is no longer being used and the time that free function 411 frees the object.

Figure 5:
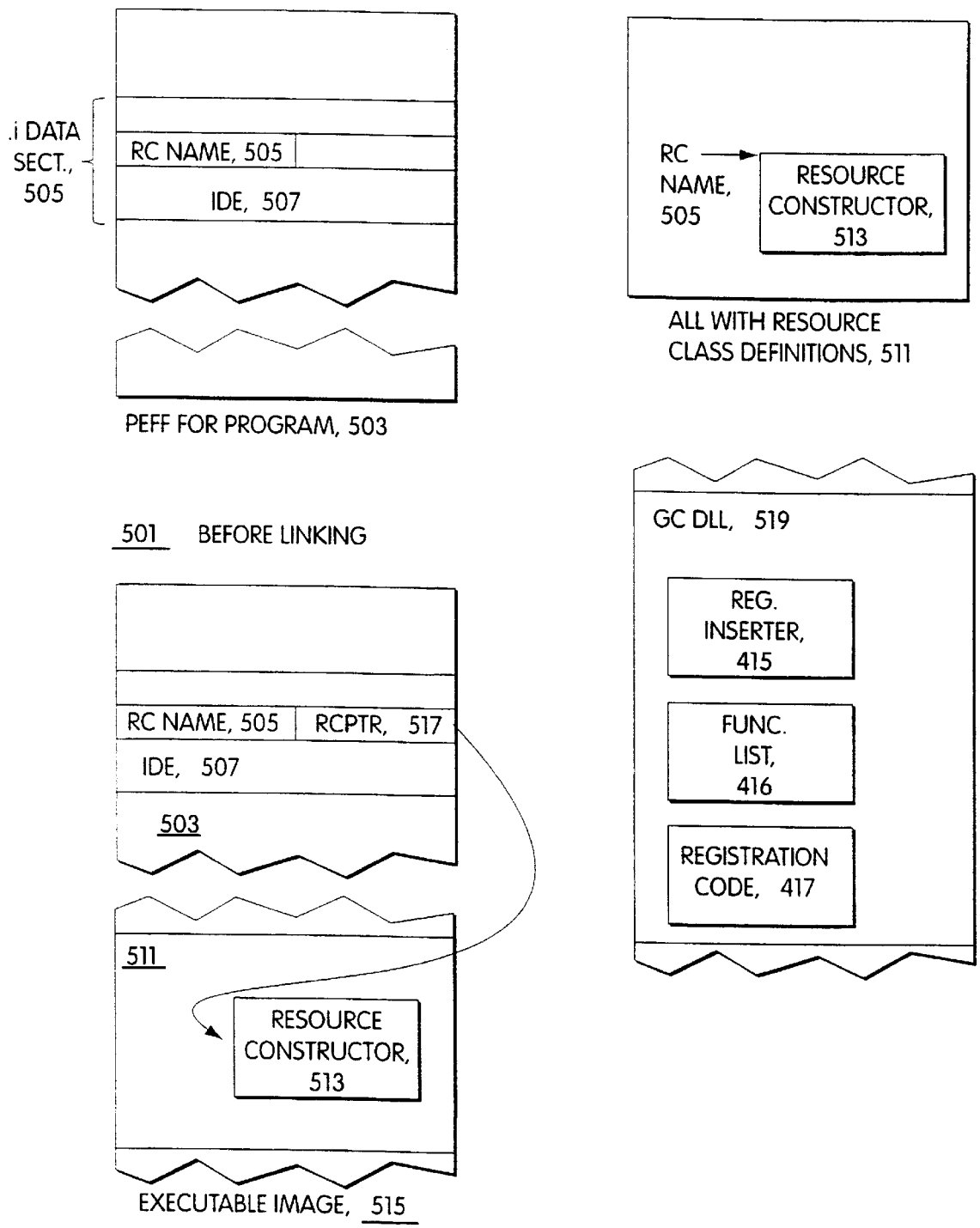
FIG. 5 shows the Windows PE format files and DLLs, as well as linking.
Figure 6:
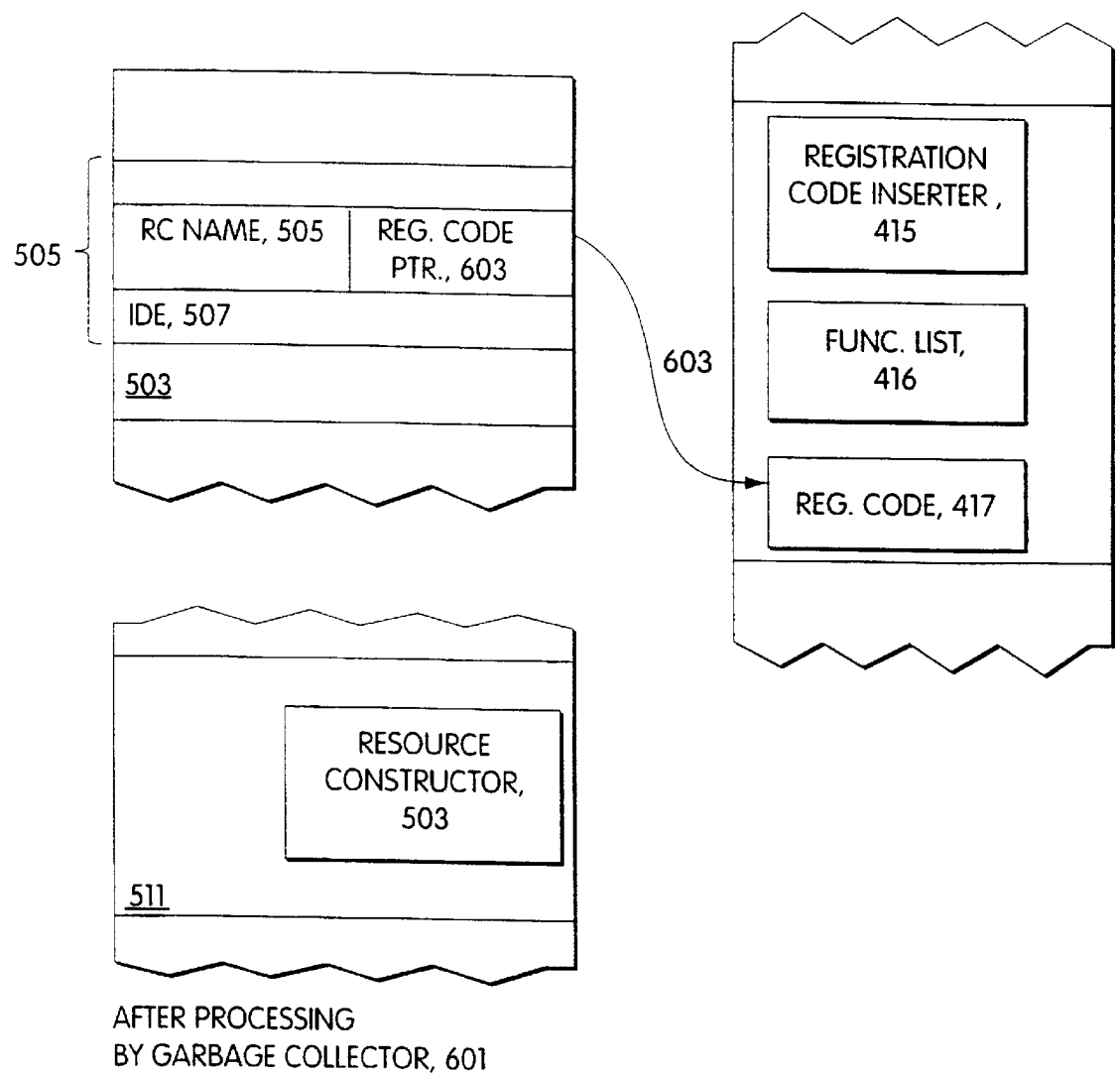
FIG. 6 shows how the garbage collector modifies the executable image.
Figure 7:
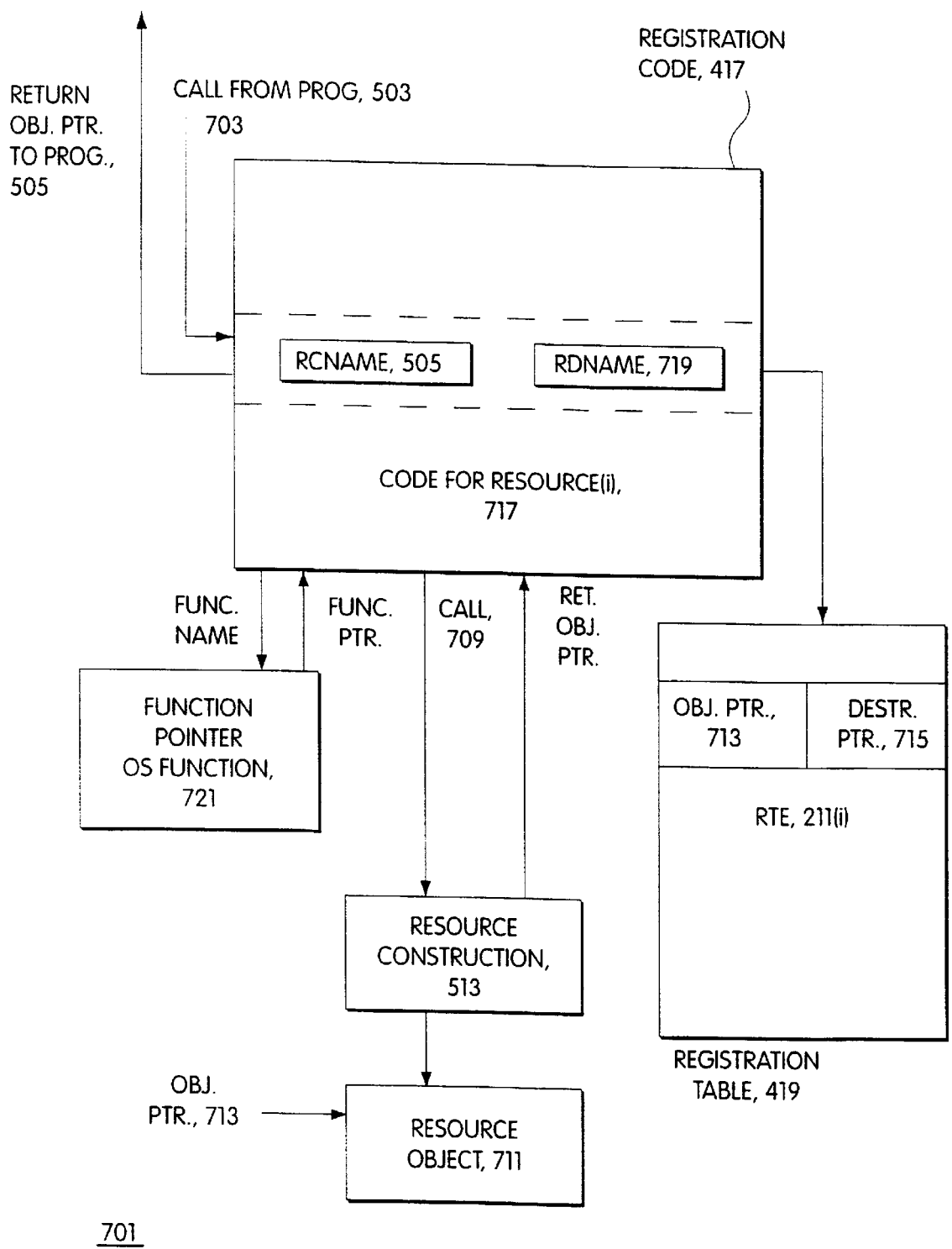
FIG. 7 shows how the registration code makes an entry for an object in registration table 419 when the object's constructor is invoked.

Detailed Description of a Preferred Embodiment: FIGS. 5–7

The preferred embodiment which will be described in the following is intended for use with code that is to run under the Windows brand operating system manufactured by Microsoft Corporation and with a particular set of classes that define the objects which represent the resources. The techniques used to implement the preferred embodiment are particular to the Windows environment and take advantage of detailed knowledge of the particular set of classes. As will be immediately apparent to those skilled in the art, however, these techniques or variations on them may be employed in other programming and execution environments and with other sets of classes.

In the Windows brand operating systems, as in many other operating systems, code for utility programs that are used by many user programs is contained in one or more dynamically-linked libraries, or DLLs. For example, the code for the class definitions for the objects that represent system resources in an object-oriented programming environment is contained in one or more such DLLs. Similarly, the code for a garbage collector that is to be used during execution of a program is contained in one or more such DLLs. At the beginning of execution of the program, the Windows loader dynamically combines the program with the DLLs it uses into an executable image in the memory of the computer system. It is this executable image that is actually executed by the computer system.

Code that is ready for execution by a Windows operating system is in the portable executable file format, or PE format. A description of this file format may be found in the paper, Randy Kath, *The portable executable file format from top to bottom*, 1993. The paper has been published on disc 2 of the Microsoft msdn library which accompanied Microsoft Visual C++ 6.0 Standard Edition in 1998. FIG. 5 shows a PE format file 503 for a program that will be executed with a garbage collector. Included in PE file 503 is an .idata section 505, which contains an idata entry (IDE)

507 for each imported function that is invoked by the program. An imported function is a function that is not contained in the file to which the idata section 505 belongs. All functions from a DLL that are invoked by a program that uses the DLL are of course imported functions. The IDE 507 identifies the imported function by name, that is, the information in the IDE can be used to locate the DLL file 511 containing the function and the function within the DLL file. The IDE 507 also contains space 506 for a pointer to the function. As will be explained below, the loader adds the pointer prior to execution of the program.

IDE 507 shown in FIG. 5 contains resource constructor name 505, which is the name used to specify resource constructor code 513 in DLL 511. Next to name 505 is the space 506 for the pointer. DLL 511 in turn contains class definitions for the resources provided by the operating system. The DLL files are themselves PE files, and consequently contain .idata sections 505 for calls to functions in other DLL files. All calls to imported functions are made via the IDE 507 for the function.

When program 503 is to be executed, the loader component of the operating system links the file for the program 503 and the DLLs containing the functions specified in the program's .idata section 505 into a single executable image in the address space of the process that will execute the program. The executable image is shown at 515. Since the program is to be executed with a garbage collector, the executable image includes at least program 503, DLL 511, and DLL 519 for the garbage collector. Included in DLL 519 for the garbage collector are registration code inserter 415, function list 416, and registration code 417 itself. When the loader creates the executable image, it adds the pointers to the locations of the code for the imported functions in the executable image to the names of the functions in .idata section 505 of PE file 503 and in the DLLs. Thus, .idata section 505 now not only contains RC name 509, but RC pointer 517 that points to the location of resource constructor 513's code in the executable image.

In the preferred embodiment, when a program is to be executed with the garbage collector, the user starts the garbage collector and the garbage collector then starts the program. Where the program was not written for execution with the garbage collector, the garbage collector modifies the idata sections of the executable image and its DLLs other than the garbage collector DLL before starting the program. The modifications replace pointers in the idata sections 505 which point to functions which have consequences for garbage collection, such as memory allocate and free functions, with pointers to modified versions of those functions in the garbage collector DLL. The general technique of modifying the idata sections that is used here is discussed in detail in the paper ??????? [Mike—I need a bibliography reference for the .idata modification paper you gave me.]

In the preferred embodiment, the technique of modifying the idata section is also used by the garbage collector to ensure that objects which may use non-memory resources are registered in registration table 419. The program 503 whose execution is to be started by the garbage collector is linked with a specific set of DLLs containing the class definitions for the resources that are of interest to the garbage collector, and function list 416 contains the names of the constructors for these resources. The actual modification is done by registration code inserter 415. Registration code inserter 415 scans the .idata sections 505 of program 503 and its DLLs other than the garbage collector DLL in executable image 515. Whenever registration code inserter 415 finds an IDE 507 that contains RC name 505 for one of the resource constructors, it replaces pointer 517 to the resource constructor with a pointer to registration code 417.

The results of the garbage collector's modifications in this regard are shown at 601 in FIG. 6. IDE 507, which formerly contained a pointer to resource constructor 503, now contains a registration code pointer 603 to registration code 417 in garbage collector DLL 519. In the preferred embodiment, registration code 417 contains registration code for each resource constructor that is of interest and registration code pointer 603 points to the part of registration code 417 that does the registration for the resource constructor indicated by resource constructor name 505. The same thing is done with pointers to constructors which involve non-memory resources in all of the DLLs in the executable image.

It should be noted here that the modification technique just described is effective in the Windows operating system environment because all calls to imported functions are made through IDEs 507 in idata sections 505 and because the Windows operating system permits an executing program to modify its own executable image 515. In environments where there is no such restriction on calls to imported functions, registration code inserter 415 may have to find such calls in the body of the executable image, and in environments which prohibit the executing program from modifying its own executable image 515, registration code inserter 415 may have to find such calls in the DLLs prior to linking. In such a case, of course, inserter 415 would replace the invocation by name of the resource constructor with an invocation by name of registration code 417. With all of these variations, however, what changes is not so much the technique as the area of the executable image or the program files which needs to be searched and the time at which the search and replacement must be done.

Once the garbage collector has modified executable image 515 as just described, it begins executing program 503. When program 503 or a DLL makes a call to a resource constructor, the modified IDE 507 transforms the call into a call to registration code 417. FIG. 7 shows what happens when registration code 417 is executed. The call to registration code 417 goes to the portion 717 of the code for the resource whose object the resource constructor constructs. Portion 717 of the code contains both the name of the resource constructor 505 and the name 719 of the destructor for objects representing the resource.

The Windows operating systems include a function 721 which, when given a handle to a DLL file and the name of a function in the file, returns the pointer to the function's location in executable image 515. Portion 717 first uses OS system 721 to obtain the pointer to resource constructor 513. Using this pointer, portion 717 invokes resource constructor 513, which constructs resource object 711 and returns object pointer 713 to registration code 417. Portion 717 then uses Rdname 719 with OS function 721 to obtain the pointer to the destructor function for the objec. Now that portion 717 has both the pointer to object 713 and the pointer to destructor 715, portion 717 makes registration table entry 211(*i*) for the object and destructor. Having done so, it returns object pointer 713 to program 503. From program 503's point of view, the result of the invocation of portion 717 of the registration code is exactly the same as if resource constructor 513 had been invoked.

It should be pointed out here that the techniques employed in the preferred embodiment to get the information needed to replace the calls to the constructors for the relevant objects with calls to the registration function and the information that the registration function needs to make the entry in registration table 419 for the object are particular to the program execution environment provided by the Windows operating system. In other execution environments, other techniques may be used to obtain the information. For example, call redirection may be done at earlier stages in the progress of the code from source code to an executable image, or may be done upon the actual execution of the call.

Similarly, the techniques used to obtain pointers to the constructors and destructors may vary. For example, in the absence of an operating system function that provides a pointer, the garbage collector may have to build its own table which relates the names of constructors and destructors to their pointers. In some programming environments, the information may be obtainable from the objects themselves. For example, if the constructor and destructor pointers are at fixed places in all objects, the garbage collector could obtain them from those fixed locations. Moreover, to the extent that the programming environment makes an object's class information available when the program is executed, the garbage collector can use the class information to obtain the necessary pointers.

The garbage collector of the preferred embodiment is a mark and sweep incremental garbage collector. In such garbage collectors, the objects that are currently in use by the program are marked and then the ones that are not in use are swept, that is, freed. The destructor for an object may be executed at any time before the object itself is freed. In the preferred embodiment, the garbage collector executes the destructors immediately after the sweep. It does so by executing registration table reader 421, which in a preferred embodiment takes each valid RTE 211 in turn and determines whether the object specified by object pointer 713 has been marked as being in use. If it has not been so marked, table reader 421 calls the destructor specified by destructor pointer 715 in the entry. After the destructor has been called, table reader 421 invalidates table entry 211, making it available for use by other objects.

Program code 503 may explicitly free objects, either because it was legacy code that was not originally written for use with a garbage collector or because precise control over when an object is freed is desired. In order to deal with such programs, the garbage collector uses the techniques just described to replace the operating system's free function with its own free function. This free function examines registration table 419 to determine whether the object being freed has an entry 211 in the table; if it does, the free function executes the object's destructor code. To speed up the examination of registration table 419, the free function may use searching techniques such as hashing.

Conclusion

The foregoing Detailed Description has described in detail the best mode presently known to the inventors of automatically registering objects that require destructor functions to be executed before they are freed with a garbage collector so that the garbage collector can execute the destructor function before it frees the object. The automatic registration techniques disclosed herein not only free the programmer of the burden of including registration functions in his programs, they also make it possible to do resource garbage collection with legacy programs and thereby to prevent resource leaks. It should further be pointed out that the automatic registration techniques described herein are not limited to destructors for resources, but can be employed in any situation where a finalizer needs to be executed before an object is freed.

While the preferred embodiment is implemented in the environment provided by the Windows brand operating systems and indeed takes advantage of certain features of that environment, it will be immediately apparent to those skilled in the relevant arts that the automatic registration techniques are disclosed herein are not limited to the Windows brand operating system environment, but may be employed with the variations necessary for the environment in any environment in which it is possible to determine that an execution of a program will use a resource or an object and that the execution has ceased using the resource or object.

For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. A method of releasing a resource used by an execution of a program in a computer system when the execution no longer requires the resource, the method comprising the steps performed by one or more other programs executing in the computer system of:

automatically determining from the program that the execution will use the resource;

automatically modifying the program's behavior such that the execution makes an entry for the resource in a registry; and automatically determining from the state of the execution that the execution is finished with the resource and thereupon releasing the resource when the registry so indicates.

2. The method set forth in claim 1 wherein the step of modifying the program's behavior includes the step of:

automatically modifying the program's code such that execution of the modified code results in the modified behavior.

3. The method set forth in claim 2 wherein:

the step of automatically determining from the program that the execution will use the resource includes the step of detecting an invocation of a resource providing function that provides the resource to the execution in the program; and the step of automatically modifying the program's code includes the step of modifying the code containing the invocation so that execution of the invocation is accompanied by making the entry for the resource.

4. The method set forth in claim 3 wherein the step of modifying the code containing the invocation comprises the step of:

replacing the invocation of the resource providing function with an invocation of an entry making function whose execution results in the entry being made and the resource providing function being executed.

5. The method set forth in any one of claims 1 through 4 wherein:

the step of modifying the program's behavior is done at any time through execution of the program.

6. The method set forth in any one of claims 1 through 4 wherein:

the resource is associated with an object;

in the step of automatically modifying the program's code, the program's code is automatically modified so that the execution makes the entry when the object is created; and in the step of automatically determining whether the execution is finished with the resource, the execution is determined to be finished with the resource when the execution is no longer using the object.

7. The method set forth in claim 6 wherein:

the execution of the program takes place in an environment which includes a garbage collector; and in the step of automatically determining whether the execution is finished with the resource, the garbage collector determines that the execution is no longer using the object and releases the resource prior to freeing the object.

8. The method set forth in claim 7 wherein:

the garbage collector performs the steps of automatically determining from the program that the execution will use the resource and automatically modifying the program's behavior.

9. The method set forth in claim 8 wherein:

the garbage collector performs the steps of automatically determining from the program that the execution will use the resource and automatically modifying the program's behavior at any time through execution of the program.

10. A device that stores data, the device being characterized in that:

the device contains code which, when executed in a computer system, performs the steps of the method set forth in claim 8.

11. A device that stores data, the device being characterized in that:

the device contains code which, when executed in a computer system, performs the steps of the method set forth in any one of claims 1 through 4.

12. A method of executing a finalizer associated with an object when an execution of a program in a computer system no longer requires the object, the method comprising the steps performed by one or more other programs executing in the computer system of:

automatically determining from the program that the execution will use the object;

automatically modifying the program's behavior such that that the execution makes an entry for the finalizer in a registry; and automatically determining from the state of the execution that the execution is finished with the object and from the entry that the finalizer is to be executed and thereupon executing the finalizer in conjunction with freeing the object.

13. The method set forth in claim 12 wherein the step of modifying the program's behavior includes the step of:

automatically modifying the program's code such that execution of the modified code results in the modified behavior.

14. The method set forth in claim 13 wherein:

the step of automatically determining from the program that the execution will use the object includes the step of detecting an invocation of an object creation function that creates the object; and the step of automatically modifying the program's code includes the step of modifying the code containing the invocation so that execution of the invocation is accompanied by making the entry for the finalizer.

15. The method set forth in claim 14 wherein the step of modifying the code containing the invocation comprises the step of:

replacing the invocation of the object creating function with an invocation of an entry making function whose execution results in the entry being made and the object creating function being executed.

16. The method set forth in any one of claims 12 through 15 wherein:

the step of modifying the program's behavior is done at any time through execution of the program.

17. The method set forth in any one of claims 12 through 15 wherein:

the execution of the program takes place in an environment which includes a garbage collector; and in the step of automatically determining whether the execution is finished with the object, the garbage collector determines that the execution is no longer using the object and executes the finalizer prior to freeing the object.

18. The method set forth in claim 17 wherein:

the garbage collector performs the steps of automatically determining from the program that the execution will use the object and automatically modifying the program's behavior.

19. The method set forth in claim 18 wherein:

the garbage collector performs the steps of automatically determining from the program that the execution will use the object and automatically modifying the program's behavior at any time through execution of the program.

20. A device that stores data, the device being characterized in that:

the device contains code which, when executed in a computer system, performs the steps of the method set forth in claim 18.

21. A device that stores data, the device being characterized in that:

the device contains code which, when executed in a computer system, performs the steps of the method set forth in any one of claims 12 through 15.

22. A method of automatically registering a resource used by an execution of a program in a computer system for release when the execution no longer requires the resource, the method comprising the steps performed by one or more other programs executing in the computer system of:

automatically determining from the program that the execution will use the resource; and automatically modifying the program's behavior such that that the execution makes an entry for the resource in a registry, the entry being used when the execution is finished therewith to determine that the resource is to be released.

23. The method set forth in claim 22 wherein the step of modifying the program's behavior includes the step of:

automatically modifying the program's code such that execution of the modified code results in the modified behavior.

24. The method set forth in claim 23 wherein:

the step of automatically determining from the program that the execution will use the resource includes the step of detecting an invocation of a resource providing function that provides the resource to the execution in the program; and the step of automatically modifying the program's code includes the step of modifying the code containing the invocation so that execution of the invocation is accompanied by making the entry for the resource.

25. The method set forth in claim 24 wherein the step of modifying the code containing the invocation comprises the step of:

replacing the invocation of the resource providing function with an invocation of an entry making function whose execution results in the entry being made and the resource providing function being executed.

26. The method set forth in any one of claims 22 through 25 wherein:

the step of modifying the program's behavior is done at any time through execution of the program.

27. The method set forth in any one of claims 22 through 25 wherein:

the resource is associated with an object; and in the step of automatically modifying the program's code, the program's code is automatically modified so that the execution makes the entry when the object is created.

28. The method set forth in claim 27 wherein:

the execution of the program takes place in an environment which includes a garbage collector; and the garbage collector performs the steps of automatically determining from the program that the execution will use the resource and automatically modifying the program's behavior.

29. The method set forth in claim 28 wherein:

the garbage collector performs the steps of automatically determining from the program that the execution will use the resource and automatically modifying the program's behavior at any time through execution of the program.

30. A device that stores data, the device being characterized in that:

the device contains code which, when executed in a computer system, performs the steps of the method set forth in claim 28.

31. A device that stores data, the device being characterized in that:

the device contains code which, when executed in a computer system, performs the steps of the method set forth in any one of claims 22 through 25.

32. A method of automatically registering a finalizer associated with an object for execution when a program's execution in a computer system no longer requires the object, the method comprising the steps performed by one or more other programs executing in the computer system of:

automatically determining from the program that the execution will use the object; and automatically modifying the program's behavior such that that the execution makes an entry for the finalizer in a registry, the entry being used when the execution is finished with the object to determine that the finalizer is to be executed in conjunction with freeing the object.

33. The method set forth in claim 32 wherein the step of modifying the program's behavior includes the step of:

automatically modifying the program's code such that execution of the modified code results in the modified behavior.

34. The method set forth in claim 33 wherein:

the step of automatically determining from the program that the execution will use the object includes the step of detecting an invocation of an object creating function; and the step of automatically modifying the program's code includes the step of modifying the code containing the invocation so that execution of the invocation is accompanied by making the entry for the finalizer.

35. The method set forth in claim 34 wherein the step of modifying the code containing the invocation comprises the step of:

replacing the invocation of the object creating function with an invocation of an entry making function whose execution results in the entry being made and the object creating function being executed.

36. The method set forth in any one of claims 32 through 35 wherein:

the step of modifying the program's behavior is done at any time through execution of the program.

37. The method set forth in any one of claims 32 through 35 wherein:

the execution of the program takes place in an environment which includes a garbage collector; and the garbage collector performs the steps of automatically determining from the program that the execution will use the object and automatically modifying the program's behavior.

38. The method set forth in claim 37 wherein:

the garbage collector performs the steps of automatically determining from the program that the execution will use the object and automatically modifying the program's behavior at any time through execution of the program.

39. A device that stores data, the device being characterized in that:

the device contains code which, when executed in a computer system, performs the steps of the method set forth in claim 37.

40. A device that stores data, the device being characterized in that:

the device contains code which, when executed in a computer system, performs the steps of the method set forth in any one of claims 32 through 35.

41. A garbage collector that automatically executes a finalizer associated with an object, the object being allocated during execution of a program and the finalizer being executed in conjunction with freeing the object, the garbage collector comprising:

a registrar that registers the object in a registry of objects requiring execution of finalization code;

a program modifier that automatically modifies the program prior to execution such that allocation of the object causes the registrar to register the object in the registry; and a registry reader that executes the finalizer in conjunction with freeing the object's memory when the registry so indicates, whereby the program need not be written for execution with the garbage collector.

42. The garbage collector set forth in claim 41 wherein:

when the object is allocated, the program executes a constructor function for the object;

the program modifier detects an invocation of the constructor function and replaces the invocation of the constructor function with an invocation of the registrar; and the registrar invokes the constructor function in conjunction with registering the object.

43. The garbage collector set forth in any one of claims 41 through 42 wherein:

the program modifier modifies the program at any time through execution of the program.

44. The garbage collector set forth in any one of claims 41 through 42 wherein:

the program modifier modifies the program after the program is compiled.

45. The garbage collector set forth in any one of claims 41 through 42 wherein:

the program modifier modifies the program before the program is compiled.

46. The garbage collector set forth in any one of claims 41 through 42 wherein:

the object represents a non-memory resource;

creation of the object at least potentially allocates the resource; and the finalizer frees the allocated resource.

47. A device that stores data, the device being characterized in that:

the device contains code which, when executed in a computer system, implements the garbage collector set forth in any one of claims 41 through 42.

* * * * *